(12) United States Patent
Shinohara et al.

(10) Patent No.: US 12,095,338 B2
(45) Date of Patent: Sep. 17, 2024

(54) FLUID MACHINE

(71) Applicant: KABUSHIKI KAISHA TOYOTA JIDOSHOKKI, Kariya (JP)

(72) Inventors: Koki Shinohara, Kariya (JP); Junya Yano, Kariya (JP); Yusuke Kinoshita, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 247 days.

(21) Appl. No.: 17/706,096

(22) Filed: Mar. 28, 2022

(65) Prior Publication Data
US 2022/0320949 A1 Oct. 6, 2022

(30) Foreign Application Priority Data

Mar. 31, 2021 (JP) .................... 2021-060893

(51) Int. Cl.
*H02K 5/22* (2006.01)
*B60H 1/32* (2006.01)
*H02K 11/33* (2016.01)

(52) U.S. Cl.
CPC ............. *H02K 5/225* (2013.01); *H02K 11/33* (2016.01); *B60H 1/3222* (2013.01); *H02K 2211/03* (2013.01)

(58) Field of Classification Search
CPC .... H02K 5/225; H02K 11/33; H02K 2211/03; H02K 5/08; H02K 15/14; H02K 5/04; H02K 5/10; H02K 7/14; H02K 5/22; H02K 5/24; H02K 2203/06; B60H 1/3222; F04B 17/03; F04B 35/04; F04C 23/02; F04C 29/00; F04C 18/0215; F04C 29/0085; F04C 2240/30; F04C 2240/403
See application file for complete search history.

(56) References Cited

U.S. PATENT DOCUMENTS

| 2017/0018939 A1* | 1/2017 | Shiba ...................... H02J 7/342 |
| 2017/0033643 A1* | 2/2017 | Naka ...................... H02K 11/30 |

FOREIGN PATENT DOCUMENTS

| JP | 2013-179186 A | 9/2013 |
| JP | 2016-098664 A | 5/2016 |

* cited by examiner

*Primary Examiner* — Tulsidas C Patel
*Assistant Examiner* — Joshua M Rodriguez
(74) *Attorney, Agent, or Firm* — Sughrue Mion, PLLC

(57) ABSTRACT

A fluid machine includes an inverter compartment defined by a housing and a cover, the inverter compartment accommodating an inverter, and a wire electrically connected to an external connector and supplying power to a circuit board of the inverter. The wire includes a board coupling portion electrically connected to the circuit board, a connector coupling portion electrically connected to the external connector, and an extended portion extending along a wall surface of the cover and connecting the board coupling portion and the connector coupling portion. The fluid machine further includes a plastic mold covering the extended portion, and an anchor formed integrally with the plastic mold and engaged with a through-hole of the cover. The extended portion is held on the wall surface of the cover by the anchor.

7 Claims, 4 Drawing Sheets

FLUID MACHINE

BACKGROUND

1. Field

The following description relates to a fluid machine.

2. Description of Related Art

A fluid machine includes a housing into which fluid is drawn, an electric motor accommodated in the housing, and an inverter that drives the electric motor. The housing includes a metal cover. The housing and the cover define an inverter compartment. The inverter compartment accommodates the inverter. The fluid machine further includes a wire that supplies power to the circuit board of the inverter. The wire is electrically connected to an external connector. The wire includes a board coupling portion electrically connected to the circuit board and a connector coupling portion electrically connected to the external connector. The board coupling portion is electrically connected to the circuit board and the connector coupling portion is electrically connected to the external connector so that the wire supplies power from the external connector to the circuit board.

In the fluid machine, the board coupling portion and the connector coupling portion may be arranged at separated positions along the wall surface of the cover due to, for example, limitations imposed on where the circuit board can be connected to the board coupling portion and where the external connector can be connected to the connector coupling portion. As the board coupling portion becomes farther from the connector coupling portion along the wall surface of the cover, an extending portion of the wire extending along the wall surface of the cover to the board coupling portion and the connector coupling portion becomes longer. As the extended portion becomes longer, the wire is more prone to vibration. Such wire vibration may be reduced by, for example, covering at least the extended portion with a plastic mold, and fixing the plastic mold to the cover. Japanese Laid-Open Patent Publication No. 2016-98664 discloses an example of a plastic mold fixed to the cover by bolts.

The use of bolts in the same manner as the above patent document to fix the plastic mold to the cover will increase the quantity of components. It is desirable that the quantity of components be decreased while reducing vibration in such a fluid machine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fluid machine includes: a housing configured to draw in fluid; an electric motor accommodated in the housing; an inverter configured to drive the electric motor; a metal cover attached to the housing; an inverter compartment defined by the housing and the cover, the inverter compartment accommodating the inverter; a wire configured to be electrically connected to an external connector and configured to supply power to a circuit board of the inverter, where the wire includes: a board coupling portion electrically connected to the circuit board; a connector coupling portion configured to be electrically connected to the external connector; and an extended portion extending along a wall surface of the cover and connecting the board coupling portion and the connector coupling portion, a plastic mold covering the extended portion; and an anchor formed integrally with the plastic mold and engaged with a through-hole of the cover, where the extended portion is held on the wall surface of the cover by the anchor.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A fluid machine 10 according to one embodiment will now be described with reference to FIGS. 1 to 6. The fluid machine 10 of the present embodiment is for use with, for example, a vehicle air conditioner.

Figure 1:
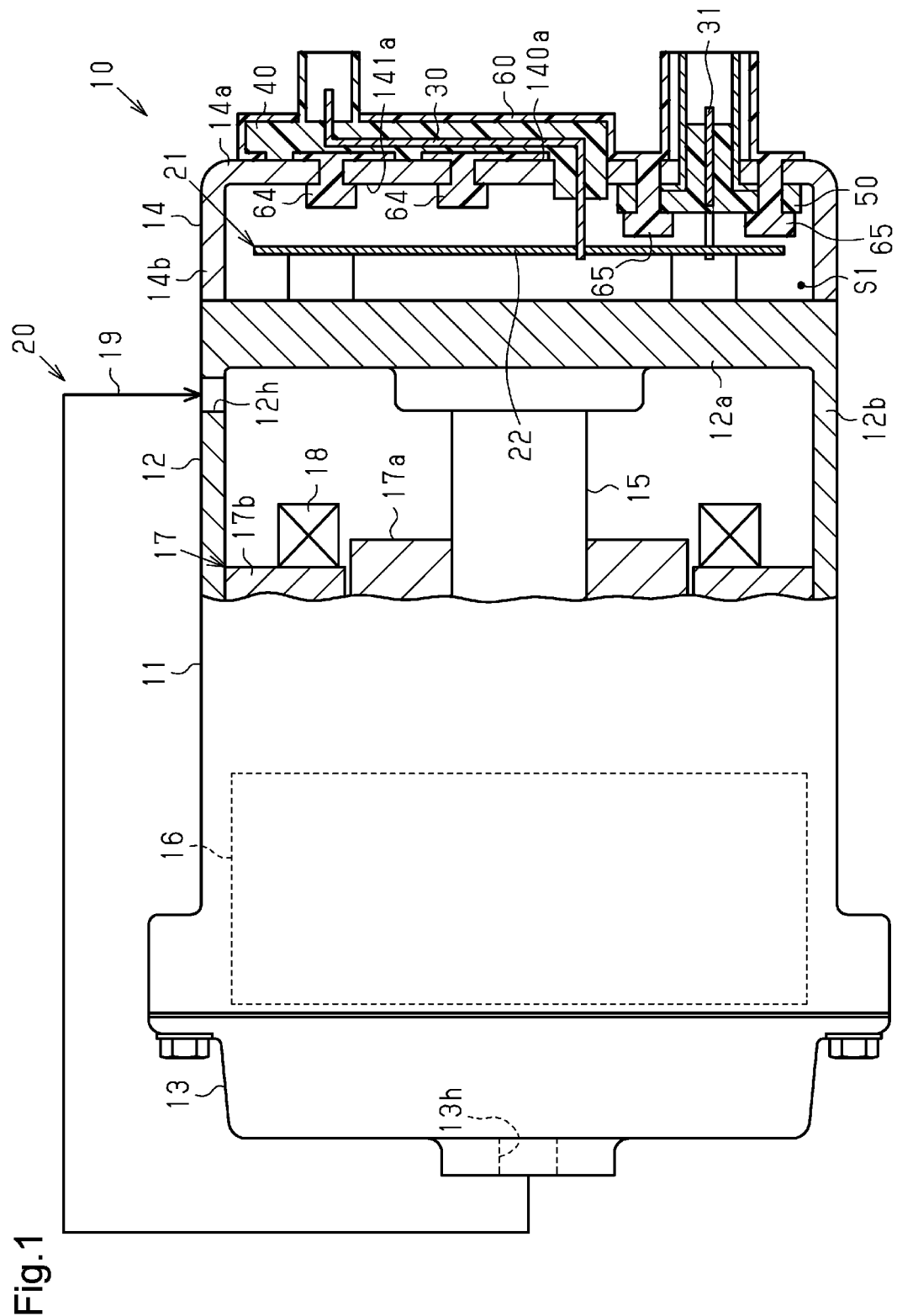
FIG. 1 is a partially cross-sectional view of a fluid machine according to an embodiment.

As shown in FIG. 1, the fluid machine 10 includes a housing 11. The housing 11 is cylindrical. The housing 11 includes a motor housing 12 and a discharge housing 13. The motor housing 12 and the discharge housing 13 are made of a metal such as aluminum.

The motor housing 12 includes an end wall 12a and a peripheral wall 12b. The end wall 12a is flat. The peripheral wall 12b is tubular and extends from the edge of the end wall 12a. The discharge housing 13 is connected to the peripheral wall 12b of the motor housing 12 at the end opposite to the end wall 12a. The discharge housing 13 closes an opening of the motor housing 12 at the side opposite to the end wall 12a.

The motor housing 12 accommodates a rotary shaft 15, a compression unit 16, and an electric motor 17. Thus, the electric motor 17 is accommodated in the housing 11. The rotary shaft 15 is rotatably supported by the motor housing 12. The compression unit 16 compresses refrigerant, which is fluid, by rotating the rotary shaft 15. The compression unit 16 is of a scroll type including a fixed scroll (not shown), which is fixed in, for example, the motor housing 12, and an orbiting scroll (not shown), which is engaged with the fixed scroll.

The electric motor 17 includes a rotor 17a and a stator 17b. The rotor 17a is fixed to the rotary shaft 15 and rotated integrally with the rotary shaft 15. The stator 17b is fixed to the inner surface of the peripheral wall 12b of the motor housing 12 around the rotor 17a. Coils 18 are wound around the teeth of the stator 17b. The coils 18 are supplied with power to rotate the rotor 17a and the rotary shaft 15. Accordingly, the electric motor 17 drives the compression unit 16 by rotating the rotary shaft 15.

The peripheral wall 12b of the motor housing 12 includes an intake port 12h. The discharge housing 13 includes a discharge port 13h. The intake port 12h is connected to one end of an external refrigerant circuit 19. The discharge port 13h is connected to the other end of the external refrigerant circuit 19. Refrigerant is drawn into the motor housing 12 through the intake port 12h from the external refrigerant circuit 19. Accordingly, the fluid machine 10 includes the housing 11 that draws in fluid. The compression unit 16 compresses the refrigerant that is drawn into the motor housing 12. The refrigerant compressed by the compression unit 16 is discharged via the discharge housing 13 through the discharge port 13h into the external refrigerant circuit 19. The refrigerant discharged into the external refrigerant circuit 19 is sent to a heat exchanger and an expansion valve (not shown) of the external refrigerant circuit 19 and returned to the motor housing 12 through the intake port 12h. The fluid machine 10 and the external refrigerant circuit 19 form a vehicle air conditioner 20.

The fluid machine 10 includes a cover 14. The cover 14 is made of a metal such as aluminum. The cover 14 includes an end wall 14a and a peripheral wall 14b. The end wall 14a is flat. The peripheral wall 14b is tubular and extends from the edge of the end wall 14a. The cover 14 is attached to the end wall 12a of the motor housing 12 with the end wall 12a of the motor housing 12 closing an opening of the peripheral wall 14b at the side opposite to the end wall 14a. The end wall 12a of the motor housing 12 and the cover 14 define an inverter compartment S1. The end wall 14a extends in a direction that is orthogonal to the axial direction of the rotary shaft 15.

The fluid machine 10 includes an inverter 21. The inverter 21 includes a circuit board 22. The inverter 21 is accommodated in the inverter compartment S1. Accordingly, the inverter compartment S1 accommodates the inverter 21. The compression unit 16, the electric motor 17, and the inverter 21 are arranged in order in the axial direction of the rotary shaft 15. The circuit board 22 is accommodated in the inverter compartment S1 in a state in which the thickness direction of the circuit board 22 coincides with the axial direction of the rotary shaft 15. Thus, a direction that is orthogonal to the thickness direction of the circuit board 22 coincides with a direction that is orthogonal to the axial direction of the rotary shaft 15. The end wall 14a extends in a direction that coincides with the direction that is orthogonal to the thickness direction of the circuit board 22.

Figure 2:
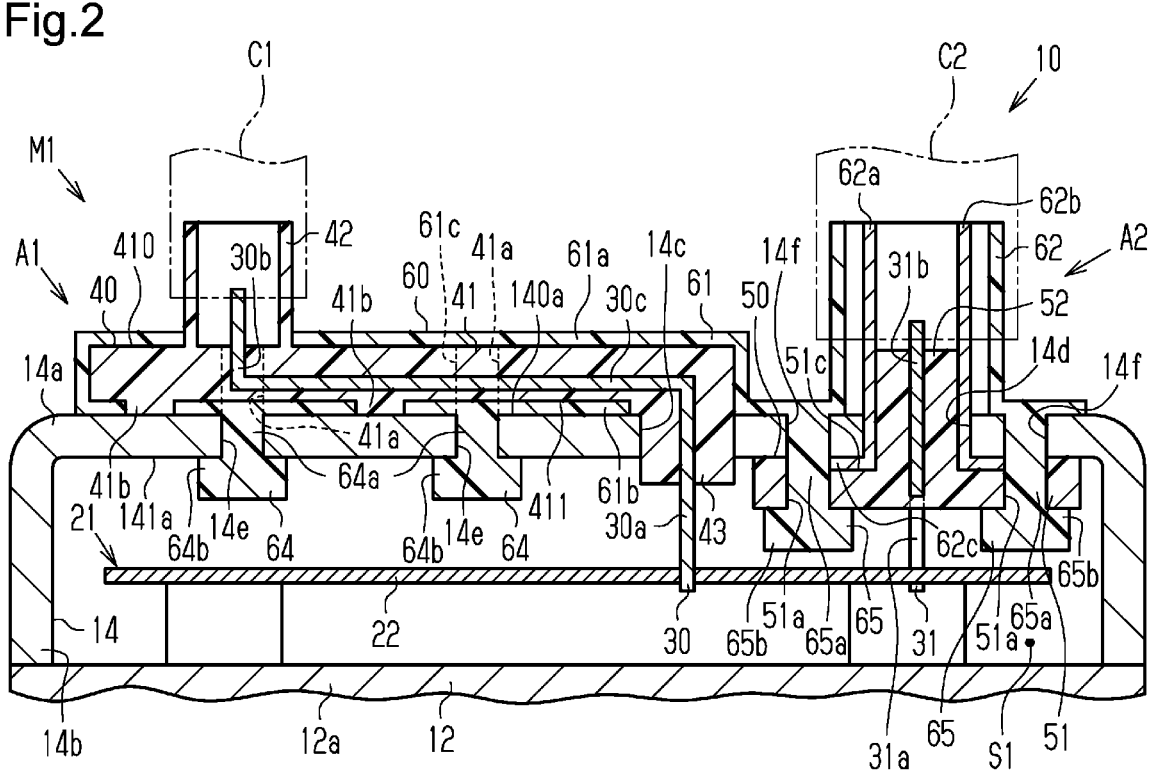
FIG. 2 is an enlarged cross-sectional view showing an inverter compartment.

As shown in FIG. 2, the end wall 14a of the cover 14 includes a first surface 140a and a second surface 141a. The first surface 140a is the surface of the end wall 14a of the cover 14 that is farther from the end wall 12a of the motor housing 12. The second surface 141a is the surface of the end wall 14a of the cover 14 that is closer to the end wall 12a of the motor housing 12.

The end wall 14a of the cover 14 includes a low-voltage insertion hole 14c and a high-voltage insertion hole 14d. The low-voltage insertion hole 14c and the high-voltage insertion hole 14d extend through the end wall 14a of the cover 14 in the thickness direction.

Figure 3:
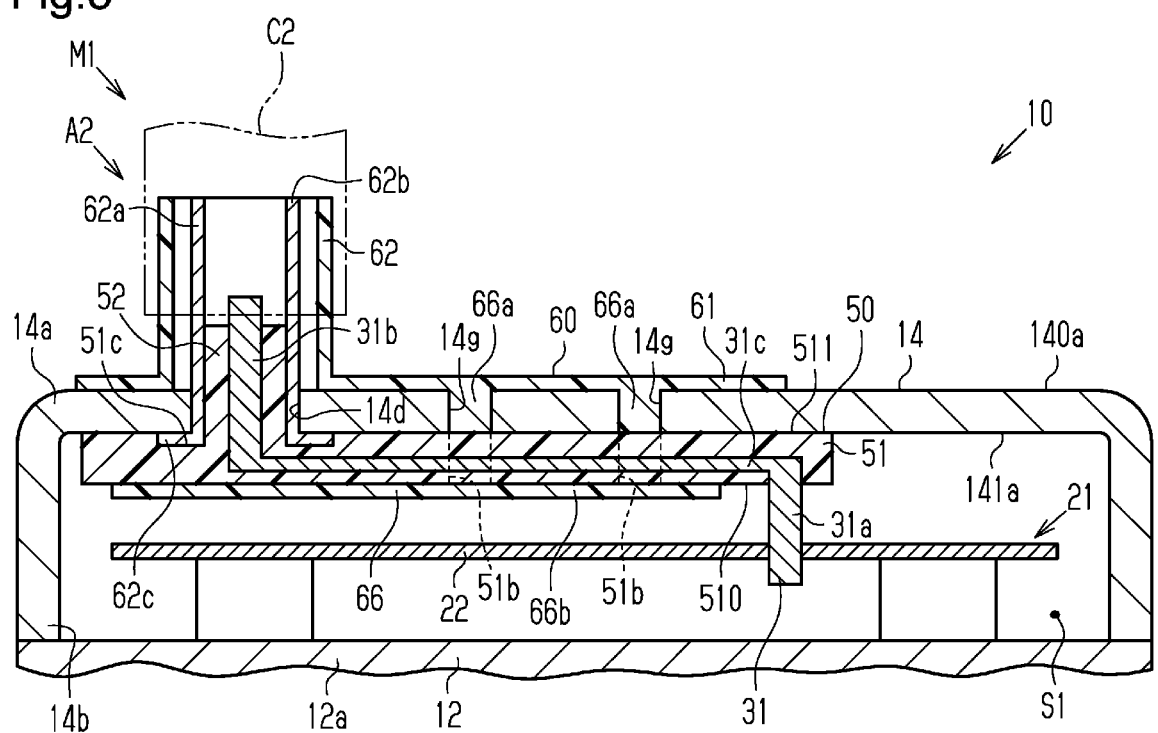
FIG. 3 is an enlarged cross-sectional view showing the inverter compartment.

As shown in FIGS. 2 and 3, the end wall 14a of the cover 14 includes first through-holes 14e, second through-holes 14f, and third through-holes 14g. The first through-holes 14e, the second through-holes 14f, and the third through-holes 14g each extend through the end wall 14a of the cover 14 in the thickness direction. Each of the first through-holes 14e, the second through-holes 14f, and the third through-holes 14g is a circular hole. The first through-holes 14e, second through-holes 14f, and the third through-holes 14g have the same diameter. The second through-holes 14f are arranged near the high-voltage insertion hole 14d in the end wall 14a of the cover 14.

As shown in FIG. 2, the fluid machine 10 includes a low-voltage wire 30, a high-voltage wire 31, and a plastic mold M1.

The low-voltage wire 30 includes a low-voltage board coupling portion 30a, a low-voltage connector coupling portion 30b, and a low-voltage extended portion 30c. Each of the low-voltage board coupling portion 30a, the low-voltage connector coupling portion 30b, and the low-voltage extended portion 30c has the form of an elongated plate. The low-voltage board coupling portion 30a extends from a first end of the low-voltage extended portion 30c in a direction that is orthogonal to the direction in which the low-voltage extended portion 30c extends. The low-voltage connector coupling portion 30b extends from a second end of the low-voltage extended portion 30c in a direction that is orthogonal to the direction in which the low-voltage extended portion 30c extends. The low-voltage extended portion 30c connects the low-voltage board coupling portion 30a and the low-voltage connector coupling portion 30b. The low-voltage connector coupling portion 30b and the low-voltage board coupling portion 30a extend in opposite directions from the low-voltage extended portion 30c.

As shown in FIGS. 2 and 3, the high-voltage wire 31 includes a high-voltage board coupling portion 31a, a high-voltage connector coupling portion 31b, and a high-voltage extended portion 31c. Each of the high-voltage board coupling portion 31a, the high-voltage connector coupling portion 31b, and the high-voltage extended portion 31c has the form of an elongated plate. The high-voltage board coupling portion 31a extends from a first end of the high-voltage extended portion 31c in a direction that is orthogonal to the direction in which the high-voltage extended portion 31c extends. The high-voltage connector coupling portion 31b extends from a second end of the high-voltage extended portion 31c in a direction that is orthogonal to the direction in which the high-voltage extended portion 31c extends. The high-voltage extended portion 31c connects the high-voltage board coupling portion 31a and the high-voltage connector coupling portion 31b. The direction in which the high-voltage connector coupling portion 31b extends from the high-voltage extended portion 31c is opposite to the direction in which the high-voltage board coupling portion 31a extends from the high-voltage extended portion 31c.

The plastic mold M1 may be made of an electrically insulative resin such as polyphenylene sulfide. The plastic mold M1 includes a first plastic section 40, a second plastic section 50, and a third plastic section 60.

As shown in FIG. 2, the first plastic section 40 holds the low-voltage wire 30. The first plastic section 40 includes a first holding portion 41, a first connector portion 42, and a second holding portion 43. The first holding portion 41 is flat. As shown by the broken lines in FIG. 2, the first holding portion 41 includes first connection holes 41a. The first connection holes 41a are circular holes. Each first connection hole 41a extends through the first holding portion 41 in the thickness direction of the first holding portion 41. The diameter of the first connection holes 41a is equal to the diameter of the first through-holes 14e in the end wall 14a of the cover 14. The first connector portion 42 is tubular and projects from an end surface 410, or one side of the first holding portion 41 in the thickness direction. The second holding portion 43 is cylindrical. The second holding portion 43 projects from an end surface 411, or the other side of the first holding portion 41 in the thickness direction. The first holding portion 41 includes projections 41b. The projections 41b are cylindrical. The projections 41b project from the end surface 411 of the first holding portion 41. Each projection 41b includes a flat distal end surface.

The low-voltage extended portion 30c is embedded in the first holding portion 41. Specifically, the low-voltage extended portion 30c is embedded in the first holding portion 41 so that the direction in which the low-voltage extended portion 30c extends coincides with a direction that is orthogonal to the thickness direction of the first holding portion 41. The end of the low-voltage connector coupling portion 30b at the side opposite to the low-voltage extended portion 30c projects out of the end surface 410 of the first holding portion 41 and is located inside the first connector portion 42. Thus, the first connector portion 42 surrounds the low-voltage connector coupling portion 30b. The end of the low-voltage board coupling portion 30a at the side opposite to the low-voltage extended portion 30c projects out of the second holding portion 43 from the end surface at the side opposite to the first holding portion 41.

The first plastic section 40 holding the low-voltage wire 30 is arranged on the cover 14 with the distal end surfaces of the projections 41b in contact with the first surface 140a of the end wall 14a of the cover 14. Further, the first connection holes 41a are aligned with the corresponding first through-holes 14e. The second holding portion 43 projects into the inverter compartment S1 through the low-voltage insertion hole 14c. The end of the low-voltage board coupling portion 30a at the side opposite to the low-voltage extended portion 30c is soldered to, for example, the circuit board 22 to electrically connect the low-voltage board coupling portion 30a to the circuit board 22. Thus, the low-voltage board coupling portion 30a is a substrate coupling portion that is electrically connected to the circuit board 22. The low-voltage board coupling portion 30a extends from the circuit board 22 in the thickness direction of the circuit board 22.

The end of the low-voltage board coupling portion 30a located closer to the low-voltage extended portion 30c extends out of the inverter compartment S1 through the low-voltage insertion hole 14c. Thus, the low-voltage insertion hole 14c is an insertion hole through which the low-voltage wire 30 is inserted. The low-voltage extended portion 30c extends along the end wall 14a of the cover 14 outside the inverter compartment S1. The low-voltage extended portion 30c is located outside the inverter compartment S1. The low-voltage extended portion 30c extends in a direction that is orthogonal to the thickness direction of the circuit board 22. Thus, the low-voltage extended portion 30c is an extended portion that extends along the end wall 14a defining the wall surface of the cover 14 and connects the low-voltage board coupling portion 30a and the low-voltage connector coupling portion 30b.

The first connector portion 42 is connected to a low-voltage connector C1 serving as an external connector. This electrically connects the low-voltage connector coupling portion 30b to the low-voltage connector C1. Thus, the low-voltage connector coupling portion 30b is a connector coupling portion electrically connected to the low-voltage connector C1. The low-voltage wire 30 supplies power from the low-voltage connector C1 to the circuit board 22 of the inverter 21. Thus, the low-voltage wire 30 is a wire that is electrically connected to the low-voltage connector C1 and supplies power to the circuit board 22 of the inverter 21.

As shown in FIGS. 2 and 3, the second plastic section 50 holds the high-voltage wire 31. The second plastic section 50 includes a third holding portion 51 and a fourth holding portion 52. The third holding portion 51 is flat. As shown in FIG. 2, the third holding portion 51 includes second connection holes 51a. As shown by the broken lines of FIG. 3, the third holding portion 51 includes third connection holes 51b. The second connection holes 51a and the third connection holes 51b are circular holes. The second connection hole 51a and the third connection hole 51b each extend through the third holding portion 51 in the thickness direction of the third holding portion 51. The second connection holes 51a have the same diameter as the second through-holes 14f in the end wall 14a of the cover 14, and the third connection holes 51b have the same diameter as the third through-holes 14g in the end wall 14a of the cover 14. The third holding portion 51 includes an end surface 511 at one side in the thickness direction of the third holding portion 51. The end surface 511 includes a groove 51c. The second connection holes 51a are arranged near the groove 51c.

The second plastic section 50 includes an integrated metal shield 62a. The shield 62a includes a tube 62b and a fixed portion 62c. The fixed portion 62c is a flange projecting outward from a first end of the tube 62b. The shield 62a is arranged in the third holding portion 51 so that the fixed portion 62c is fitted into the groove 51c and the tube 62b projects out of the third holding portion 51 from the groove 51c.

The fourth holding portion 52 is cylindrical. The fourth holding portion 52 projects from the bottom surface of the groove 51c. Specifically, the fourth holding portion 52 projects from the bottom surface of the groove 51c into the tube 62b of the shield 62a. The fourth holding portion 52 contacts the inner surface of the tube 62b of the shield 62a.

The high-voltage extended portion 31c is embedded in the third holding portion 51. Specifically, the high-voltage extended portion 31c is embedded in the third holding portion 51 so that the direction in which the high-voltage extended portion 31c extends coincides with a direction that is orthogonal to the thickness direction of the third holding portion 51. The end of the high-voltage connector coupling portion 31b at the side opposite to the high-voltage extended portion 31c projects out of the end surface of the fourth holding portion 52 at the side opposite to the third holding portion 51. The end of the high-voltage connector coupling portion 31b at the side opposite to the high-voltage extended portion 31c is located inside the tube 62b of the shield 62a.

The end of the high-voltage board coupling portion 31a at the side opposite to the high-voltage extended portion 31c projects out of the other end surface 510 of the third holding portion 51 in the thickness direction.

The second plastic section 50 holding the high-voltage wire 31 is arranged on the cover 14 with the end surface 511 of the third holding portion 51 in contact with the second surface 141a of the end wall 14a of the cover 14. Further, the second connection holes 51a are aligned with the corresponding second through-holes 14f. The third connection holes 51b are aligned with the corresponding third through-holes 14g. The end of the high-voltage board coupling portion 31a at the side opposite to the high-voltage extended portion 31c is soldered to, for example, the circuit board 22 to electrically connect the high-voltage board coupling portion 31a to the circuit board 22. Thus, the high-voltage board coupling portion 31a is a board coupling portion electrically connected to the circuit board 22. The high-voltage board coupling portion 31a extends from the circuit board 22 in the thickness direction of the circuit board 22.

The shield 62a projects out of the inverter compartment S1 through the high-voltage insertion hole 14d. The fixing portion 62c is engaged with the second surface 141a of the end wall 14a of the cover 14 around the high-voltage insertion hole 14d. The fourth holding portion 52 projects out of the inverter compartment S1 through the high-voltage insertion hole 14d. The end of the high-voltage connector coupling portion 31b at the side opposite to the high-voltage extended portion 31c projects out of the inverter compartment S1 through the high-voltage insertion hole 14d. Thus, the high-voltage insertion hole 14d is a through-hole through which high-voltage wire 31 is inserted.

The high-voltage extended portion 31c extends along the end wall 14a of the cover 14 in the inverter compartment S1. The high-voltage extended portion 31c is located inside the inverter compartment S1. The high-voltage extended portion 31c extends in a direction that is orthogonal to the thickness direction of the circuit board 22. Thus, the high-voltage extended portion 31c is an extended portion that extends along the end wall 14a of the cover 14 and connects the high-voltage board coupling portion 31a to the high-voltage connector coupling portion 31b. The extended portion of the present embodiment includes the low-voltage extended portion 30c of the low-voltage wire 30 and the high-voltage extended portion 31c of the high-voltage wire 31.

The third plastic section 60 includes a connection portion 61 and a second connector portion 62. The second connector portion 62 is tubular and extends from the first surface 140a of the end wall 14a of the cover 14. The second connector portion 62 surrounds the tube 62b of the shield 62a. Thus, the second connector portion 62 surrounds the high-voltage connector coupling portion 31b. The second connector portion 62 is tubular and projects from the cover 14 around the high-voltage connector coupling portion 31b.

The second connector portion 62 is connected to a high-voltage connector C2 serving as an external connector. This electrically connects the high-voltage connector coupling portion 31b to the high-voltage connector C2. Thus, the second connector portion 62 is a connector portion, which is tubular, projects from the cover 14 around the high-voltage connector coupling portion 31b, and is connected to the high-voltage connector C2. The high-voltage connector coupling portion 31b is electrically connected to the high-voltage connector C2. The high-voltage wire 31 supplies power from the high-voltage connector C2 to the circuit board 22 of the inverter 21. Thus, the high-voltage wire 31 is a wire that is electrically connected to the high-voltage connector C2 and supplies power to the circuit board 22 of the inverter 21. The wire of the present embodiment includes the low-voltage wire 30 and the high-voltage wire 31.

The connection portion 61 includes a first connection portion 61a, a second connection portion 61b, and a third connection portion 61c. The connection portion 61 is thin and flat. The connection portion 61 covers part of the first surface 140a of the end wall 14a of the cover 14 and covers most of the first plastic section 40. The connection portion 61 connects the first connector portion 42 and the second connector portion 62. Thus, the third plastic section 60 connects the first plastic section 40 and the second plastic section 50.

The first connection portion 61a is thin and flat. The first connection portion 61a covers most of the end surface 410 of the first holding portion 41. The second connection portion 61b covers most of the end surface 411 of the first holding portion 41. The second connection portion 61b contacts the end surface 411 of the first holding portion 41 and the first surface 140a of the end wall 14a of the cover 14. The third connection portion 61c is arranged in the first connection holes 41a. The third connection portion 61c connects the first connection portion 61a and the second connection portion 61b.

The third plastic section 60 includes first anchors 64, second anchors 65, and a third anchor 66. Accordingly, the plastic mold M1 includes anchors.

Figure 4:
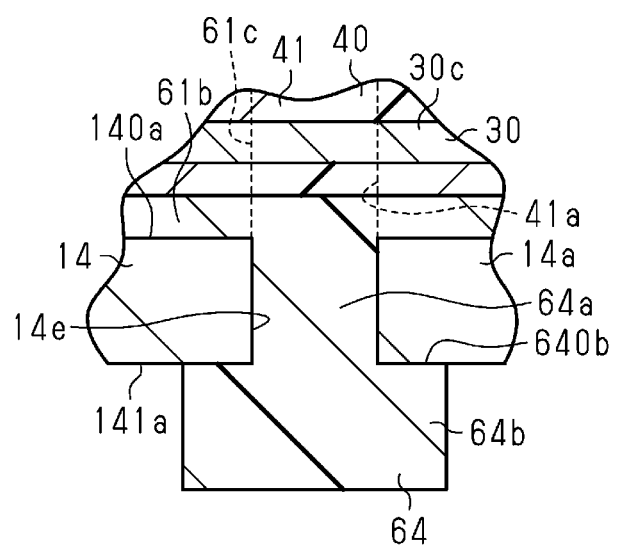
FIG. 4 is an enlarged cross-sectional view showing a first anchor.

As shown in FIGS. 2 and 4, the third plastic section 60 includes the first anchors 64. Each first anchor 64 includes a first insertion portion 64a, which serves as an insertion portion, and a first flange 64b, which serves as a flange. The first insertion portion 64a is cylindrical. The first insertion portion 64a projects from the second connection portion 61b and extends through the corresponding first through-hole 14e into the inverter compartment S1. Thus, the first insertion portion 64a is inserted through the first through-hole 14e in the end wall 14a of the cover 14. The first insertion portion 64a contacts the wall surface of the first through-hole 14e. Thus, the first anchor 64 is engaged with the first through-hole 14e.

The first flange 64b is circular and extends outward from the end of the first insertion portion 64a at the side opposite to the connection portion 61. Specifically, the first flange 64b extends outward in the radial direction of the first insertion portion 64a from where the first insertion portion 64a projects out of the first through-hole 14e into the inverter compartment S1. The first flange 64b includes an end surface 640b facing the end wall 14a of the cover 14 and engaged with the second surface 141a of the end wall 14a of the cover 14 around the first through-hole 14e. Thus, the first anchor 64 is engaged with the end wall 14a of the cover 14.

Figure 5:
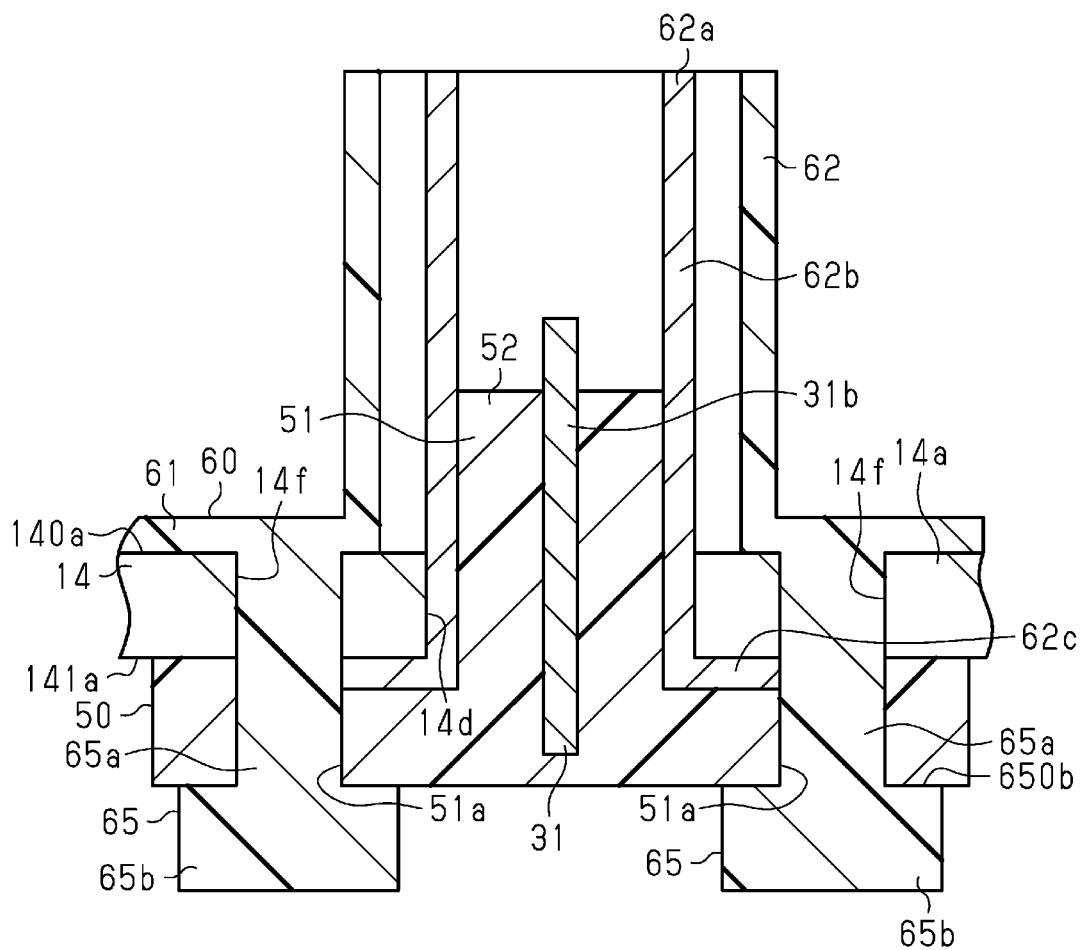
FIG. 5 is an enlarged cross-sectional view showing a second connector and two second anchors.

As shown in FIGS. 2 and 5, the third plastic section 60 includes two second anchors 65. Each second anchor 65 includes a second insertion portion 65a, which serves as an insertion portion, and a second flange 65b, which serves as a flange. The second insertion portion 65a is cylindrical. The second insertion portion 65a projects from the connection portion 61 near the second connector portion 62 and extends through the corresponding second through-hole 14f and the corresponding second connection hole 51a into the inverter compartment S1. Thus, the second insertion portion 65a is inserted through the second through-hole 14f in the end wall 14a of the cover 14. The second insertion portion 65a contacts the wall surface of the second through-hole 14f and the wall surface of the second connection hole 51*a*. Thus, the second anchor 65 is engaged with the second through-hole 14*f*.

The second flange 65*b* is circular and extends outward from the end of the second insertion portion 65*a* at the side opposite to the connection portion 61. Specifically, the second flange 65*b* extends outward in the radial direction of the second insertion portion 65*a* from where the second insertion portion 65*a* projects out of the second connection hole 51*a* into the inverter compartment S1. The second flange 65*b* includes an end surface 650*b* located toward the end wall 14*a* of the cover 14 and engaged with the third holding portion 51 around the second connection hole 51*a*. Thus, the second anchor 65 is engaged with the second surface 141*a* of the end wall 14*a* of the cover 14 around the second through-hole 14*f* through the third holding portion 51.

The two second anchors 65 are arranged near the second connector portion 62. One of the two second anchors 65 is located toward the first connector portion 42 from the second connector portion 62. The other one of the two second anchors 65 is located at the opposite side of the first connector portion 42. The second anchors 65 sandwich the second connector portion 62 in the direction in which the circuit board 22 extends. When the second anchors 65 are viewed in the thickness direction of the circuit board 22, the second anchors 65 sandwich the second connector portion 62 from opposite sides in a direction that intersects the thickness direction of the circuit board 22. Thus, the two second anchors 65 of the anchors are engaged with the end wall 14*a* of the cover 14 from the inverter compartment S1 from opposite sides that sandwich the second connector portion 62 in the direction that intersects the thickness direction of the circuit board 22. In other words, the two second anchors 65 and the second connector portion 62 are arranged in the direction that intersects the thickness direction of the circuit board 22. Further, the second connector portion 62 is located between the second anchors 65, and the second anchors 65 are engaged with the cover 14 from the inverter compartment S1.

As shown in FIG. 3, the third plastic section 60 includes the third anchor 66. The third anchor 66 includes third insertion portions 66*a*, which serve as insertion portions, and a third flange 66*b*, which serves as a flange. Each third insertion portion 66*a* is cylindrical. The third anchor 66 projects from the connection portion 61 and extends through the third through-holes 14*g* and the third connection holes 51*b* into the inverter compartment S1. Thus, the third insertion portion 66*a* is inserted through the corresponding third through-hole 14*g* in the end wall 14*a* of the cover 14. The third insertion portion 66*a* contacts the inner wall of the third through-hole 14*g* and the inner wall of the third connection hole 51*b*. Thus, the third anchor 66 is engaged with the third through-hole 14*g*.

The third flange 66*b* is flat. The third flange 66*b* contacts the surface of the third holding portion 51 at the side opposite to the end wall 14*a* of the cover 14. The thickness direction of the third flange 66*b* coincides with the thickness direction of the third holding portion 51. The third flange 66*b* connects the ends of the third insertion portions 66*a* at the opposite side of the connection portion 61. The third flange 66*b* is engaged with the third holding portion 51 around the third connection holes 51*b*. Thus, the third anchor 66 is engaged with the second surface 141*a* of the end wall 14*a* of the cover 14 around the third through-holes 14*g* through the third holding portion 51.

Process for Manufacturing the Plastic Mold M1

Figure 6:
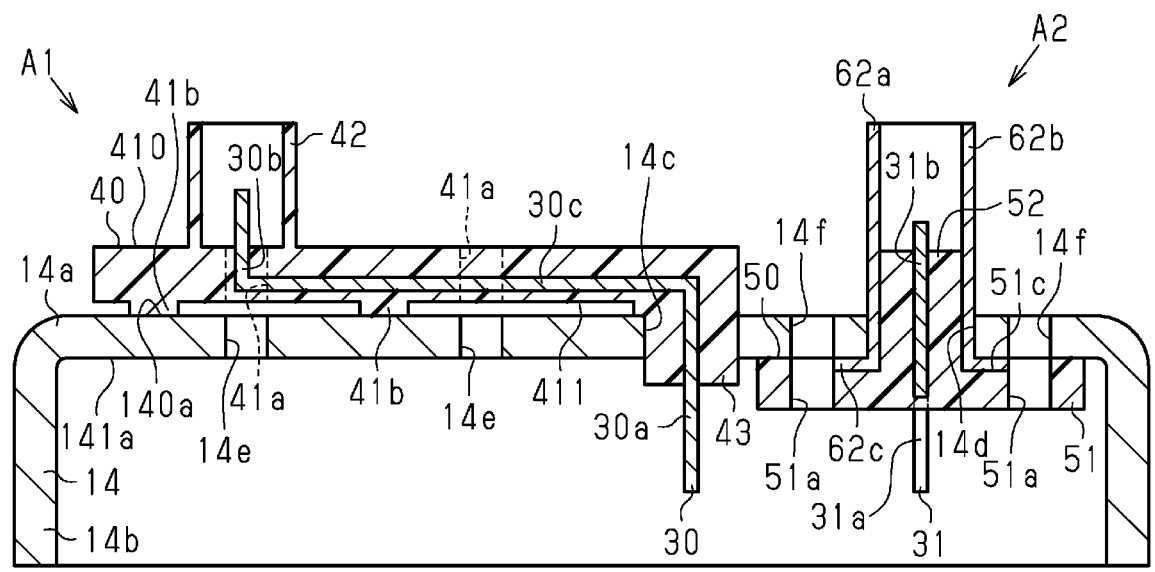
FIG. 6 is a cross-sectional view schematically showing a first structure and a second structure prior to integration.

As shown in FIG. 6, the plastic mold M1 includes a first structure A1 and a second structure A2. The first structure A1 includes the low-voltage wire 30 and the first plastic section 40. The second structure A2 includes the high-voltage wire 31, the second plastic section 50, and the shield 62*a*. The first structure A1 is arranged on the first surface 140*a* of the end wall 14*a* of the cover 14 so that the distal end surfaces of the projections 41*b* contact the first surface 140*a* of the end wall 14*a* of the cover 14. This forms a gap between the end surface 411 of the first holding portion 41 and the first surface 140*a* of the end wall 14*a* of the cover 14. The first structure A1 is arranged on the cover 14 so that the second holding portion 43 is inserted into the low-voltage insertion hole 14*c*, and the first through-holes 14*e* are aligned with the first connection holes 41*a* in the thickness direction of the circuit board 22.

Then, the second structure A2 is arranged on the second surface 141*a* of the end wall 14*a* of the cover 14. In this case, the second structure A2 is arranged on the cover 14 so that the fourth holding portion 52 and the tube 62*b* of the shield 62*a* are inserted into the high-voltage insertion hole 14*d*, and the second through-holes 14*f* are aligned with the second connection holes 51*a* in the thickness direction of the circuit board 22. Further, the second structure A2 is arranged on the cover 14 so that the third through-holes 14*g* are aligned with the third connection holes 51*b* in the thickness direction of the circuit board 22.

Then, the first structure A1, the second structure A2, and the cover 14 are set together in a mold (not shown). The first structure A1, the second structure A2, and the cover 14 set in the mold are held at exposed portions that will not be covered by the third plastic section 60. Resin is injected into the mold. The injected resin is cured to form the third plastic section 60 including the second connector portion 62, the first anchors 64, the second anchors 65, and the third anchor 66. The first structure A1 and the second structure A2 are integrated by the third plastic section 60. The plastic mold M1 is manufactured in this manner. The first structure A1 and the second structure A2 are attached to the cover 14 by the third plastic section 60. Thus, the first plastic section 40 and the second plastic section 50 are attached to the cover 14 by the third plastic section 60. The first anchors 64, the second anchors 65, and the third anchor 66 are engaged with the cover 14 to attach the plastic mold M1 to the cover 14. The first anchors 64, the second anchors 65, and the third anchor 66, which are engaged with the cover 14, are integrated with the plastic mold M1. The low-voltage extended portion 30*c* is held on the end wall 14*a* of the cover 14 by the first anchors 64, and the high-voltage extended portion 31*c* is held on the end wall 14*a* of the cover 14 by the second anchors 65 and the third anchor 66.

Operation

The operation of the present embodiment will now be described.

The first anchors 64, the second anchors 65, and the third anchor 66, which are integrated with the plastic mold M1, are engaged with the cover 14. The first anchors 64, the second anchors 65, and the third anchor 66 restrict separation and movement of the plastic mold M1 from the cover 14. This reduces vibration of the low-voltage wire 30 and the high-voltage wire 31.

Advantages

The above-described embodiment has the following advantages.

(1) The first anchors 64, the second anchors 65, and the third anchor 66, which are respectively engaged with the first through-holes 14e, the second through-holes 14f, and the third through-holes 14g, are integrated with the plastic mold M1. In other words, the first anchors 64, the second anchors 65, and the third anchor 66, which are integrated with the plastic mold M1, are respectively engaged with the first through-holes 14e, the second through-holes 14f, and the third through-holes 14g. The low-voltage extended portion 30c is held on the end wall 14a of the cover 14 by the first anchors 64, and the high-voltage extended portion 31c is held on the end wall 14a of the cover 14 by the second anchors 65 and the third anchor 66. This eliminates the need to fix the plastic mold M1 to the cover 14 using bolts as in the related art. Thus, vibration of the low-voltage wire 30 and the high-voltage wire 31 is reduced without increasing the quantity of components.

(2) The two second anchors 65 are engaged with the end wall 14a of the cover 14 from the inverter compartment S1 from opposite sides that sandwich the second connector portion 62 in the direction that is orthogonal to the thickness direction of the circuit board 22. In other words, the two second anchors 65 and the second connector portion 62 are arranged in the direction that is orthogonal to the thickness direction of the circuit board 22, the second connector portion 62 is arranged between the second anchors 65, and the second anchors 65 are engaged with the end wall 14a of the cover 14 from the inverter compartment S1. This easily restricts separation and movement of the second connector portion 62 from the cover 14. Thus, the second connector portion 62 is further securely fixed to the cover 14.

(3) The low-voltage board coupling portion 30a extends straight from the circuit board 22 out of the inverter compartment S1 through the low-voltage insertion hole 14c. This reduces the length of the low-voltage board coupling portion 30a extending in the inverter compartment S1. Thus, the space of the inverter compartment S1 can be reduced to allow for reduction in size of the fluid machine 10.

(4) The high-voltage extended portion 31c is located inside the inverter compartment S1, and the low-voltage extended portion 30c is located outside the inverter compartment S1. Thus, the cover 14 blocks electromagnetic noise between the low-voltage extended portion 30c and the high-voltage extended portion 31c.

(5) The high-voltage extended portion 31c is located inside the inverter compartment S1. Since most of the high-voltage wire 31 is accommodated in the inverter compartment S1, the cover 14 can protect the high-voltage wire 31.

(6) The first insertion portion 64a contacts the wall surface of the corresponding first through-hole 14e, and the first flange 64b is engaged with the end wall 14a of the cover 14 around the first through-hole 14e so that the first anchor 64 is engaged with the first through-hole 14e. The second insertion portion 65a contacts the wall surface of the corresponding second through-hole 14f, and the second flange 65b is engaged with the cover 14 around the second through-hole 14f in the end wall 14a so that the second anchor 65 is engaged with the second through-hole 14f. The third insertion portion 66a contacts the wall surface of the third through-hole 14g, and the third flange 66b is engaged with the cover 14 around the third through-hole 14g in the end wall 14a so that the third anchor 66 is engaged with the third through-hole 14g. Thus, the first anchor 64 is further rigidly engaged with the first through-hole 14e compared to when, for example, only the first insertion portion 64a contacts the wall surface of the first through-hole 14e and the first anchor 64 is engaged with the first through-hole 14e. The second anchor 65 is further rigidly engaged with the second through-hole 14f compared to when, for example, only the second insertion portion 65a contacts the wall surface of the second through-hole 14f and the second anchor 65 is engaged with the second through-hole 14f. Further, the third anchor 66 is further rigidly engaged with the third through-hole 14g compared to when, for example, only the third insertion portion 66a contacts the wall surface of the third through-hole 14g and the third anchor 66 is engaged with the third through-hole 14g. Thus, the first anchors 64, the second anchors 65, and the third anchor 66 further restrict separation and movement of the plastic mold M1 from the cover 14.

(7) The first plastic section 40 and the second plastic section 50 are attached to the cover 14 by the third plastic section 60. Thus, the first plastic section 40 and the second plastic section 50 are further rigidly positioned on the cover 14. This improves the hermetic seal between the first plastic section 40 and the cover 14 and between the second plastic section 50 and the cover 14.

(8) There is no need to fix the plastic mold M1 to the cover 14 using bolts as in the related art, and the cover 14 does not need bolt holes to fasten the bolts. The end wall 14a of the cover 14 does not need thickness for bolt holes. This allows the thickness of the end wall 14a of the cover 14 to be minimized and reduces the weight of the cover 14. As a result, the size of the fluid machine 10 is reduced.

(9) In the present embodiment, the step for integrating the first structure A1 and the second structure A2 is performed simultaneously with the step for attaching the plastic mold M1 to the cover 14 by engaging the first anchors 64, the second anchors 65, and the third anchor 66 with the cover 14. This simplifies the manufacturing process.

Modifications

The above-described embodiment may be modified as follows. The above-described embodiment and the following modifications can be combined as long as the combined modifications remain technically consistent with each other.

Figure 7:
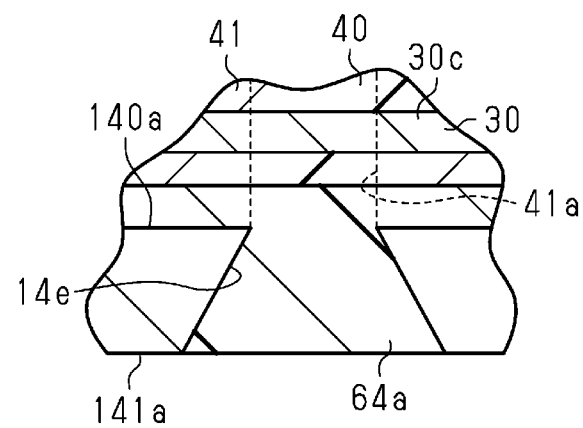
FIG. 7 is an enlarged cross-sectional view showing the first anchor in another embodiment.

As shown in FIG. 7, the first anchor 64 may include only the first insertion portion 64a arranged in the first through-hole 14e as long as the first anchor 64 can be engaged with the first through-hole 14e when the outer surface of the first insertion portion 64a of the first anchor 64 contacts the wall surface of the first through-hole 14e. The first through-hole 14e may be shaped in any manner. For example, as shown in FIG. 7, the first through-hole 14e may have a diameter that increases from the first surface 140a toward the second surface 141a of the end wall 14a of the cover 14.

In the embodiment, the low-voltage extended portion 30c may be located inside the inverter compartment S1 and the high-voltage extended portion 31c may be located outside the inverter compartment S1. Specifically, one of the low-voltage extended portion 30c and the high-voltage extended portion 31c may be located inside the inverter compartment S1, and the other one of the low-voltage extended portion 30c and the high-voltage extended portion 31c may be located outside the inverter compartment S1.

In an embodiment, the low-voltage extended portion 30c and the high-voltage extended portion 31c may be located inside the inverter compartment S1.

In an embodiment, the low-voltage extended portion 30c and the high-voltage extended portion 31c may be located outside the inverter compartment S1.

In the embodiment, the low-voltage board coupling portion 30a does not need to extend straight from the circuit board 22 out of the inverter compartment S1 through the low-voltage insertion hole 14c. The low-voltage board coupling portion 30a may extend, for example, from the circuit board 22, bend inside the inverter compartment S1, and extend out of the inverter compartment S1 through the low-voltage insertion hole 14c.

In the embodiment, the two second anchors 65 are arranged near the second connector portion 62. Instead, for example, three second anchors 65 may be arranged near the second connector portion 62. In this case, two of the second anchors 65 are engaged with the cover 14 from the inverter compartment S1 from the opposite sides that sandwich the second connector portion 62 in the direction that is orthogonal to the thickness direction of the circuit board 22. The three second anchors 65 arranged near the second connector portion 62 may form two sets of two second anchors 65 engaged with the cover 14 from the inverter compartment S1 from the opposite sides that sandwich the second connector portion 62 in the direction that is orthogonal to the thickness direction of the circuit board 22. It is only required that at least two anchors be engaged with the cover 14 from the inverter compartment S1 from opposite sides that sandwich the second connector portion 62 in the direction that intersects the thickness direction of the circuit board 22.

In the embodiment, the low-voltage insertion hole 14c and the high-voltage insertion hole 14d may include an anchor.

In the embodiment, the end wall 14a of the cover 14 is flat. Instead, for example, the end wall 14a of the cover 14 may be curved. In other words, the cover 14 may be shaped in any manner as long as the housing 11 and the inverter compartment S1 can be formed.

In the embodiment, the low-voltage wire 30 and the high-voltage wire 31 are bus bars. Instead, for example, the low-voltage wire 30 and the high-voltage wire 31 may be conducting wires having a circular cross section.

In the embodiment, the plastic mold M1 is made of polyphenylene sulfide. Instead, the plastic mold M1 may be made of, for example, polyimide resin.

In the embodiment, the compression unit 16 does not have to be of a scroll type and may be of a piston type or a vane type.

In the embodiment, the compression unit 16, the electric motor 17, and the inverter 21 do not need to be arranged in order in the axial direction of the rotary shaft 15.

In the embodiment, the compression unit 16 of the fluid machine 10 may be replaced by, for example, a pump unit that feeds fluid.

In the embodiment, the fluid machine 10 is used in the vehicle air conditioner 20. Instead, the fluid machine 10 may be installed in a fuel cell vehicle to supply a fuel cell with fluid, or air compressed by the compression unit 16.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fluid machine, comprising:
a housing configured to draw in fluid;
an electric motor accommodated in the housing;
an inverter configured to drive the electric motor;
a metal cover attached to the housing;
an inverter compartment defined by the housing and the cover, the inverter compartment accommodating the inverter;
a wire configured to be electrically connected to an external connector and configured to supply power to a circuit board of the inverter, wherein the wire includes:
a board coupling portion electrically connected to the circuit board;
a connector coupling portion configured to be electrically connected to the external connector; and
an extended portion extending along a wall surface of the cover and connecting the board coupling portion and the connector coupling portion,
a plastic mold covering the extended portion; and
an anchor formed integrally with the plastic mold and engaged with a through-hole of the cover, wherein
the extended portion is held on the wall surface of the cover by the anchor wherein,
the wire includes:
a low-voltage wire; and
a high-voltage wire to which a higher voltage is applied than the low-voltage wire,
the extended portion includes:
a low-voltage extended portion of the low-voltage wire; and
a high-voltage extended portion of the high-voltage wire,
one of the low-voltage extended portion and the high-voltage extended portion is located inside the inverter compartment, and
the other one of the low-voltage extended portion and the high-voltage extended portion is located outside the inverter compartment.

2. The fluid machine according to claim 1, wherein
the plastic mold includes a tubular connector portion that projects from the cover around the connector coupling portion and is configured to be connected to the external connector,
the anchor is one of a plurality of anchors of the plastic mold, and
two of the anchors and the connector portion are arranged in a direction that intersects a thickness direction of the circuit board, the connector portion is located between the two anchors, and the two anchors are engaged with the cover from the inverter compartment.

3. The fluid machine according to claim 1, wherein
the cover includes an insertion hole through which the wire is inserted, and
the board coupling portion extends straight from the circuit board out of the inverter compartment through the insertion hole.

4. The fluid machine according to claim 1, wherein
the high-voltage extended portion is located inside the inverter compartment, and
the low-voltage extended portion is located outside the inverter compartment.

5. The fluid machine according to claim 1, wherein the anchor includes:
an insertion portion inserted through the through-hole in contact with a wall surface of the through-hole; and
a flange that extends outward from the insertion portion and is engaged with the cover around the through-hole.

6. The fluid machine of claim 1, wherein
the low voltage extended portion extends in a direction that is orthogonal to a thickness direction of the circuit board.

7. The fluid machine of claim 1, wherein
the high voltage extended portion extends in a direction that is orthogonal to a thickness direction of the circuit board.

\* \* \* \* \*